US009096142B2

(12) United States Patent
Oda

(10) Patent No.: US 9,096,142 B2
(45) Date of Patent: Aug. 4, 2015

(54) VEHICLE INCLUDING SECONDARY BATTERY AND CONTROL METHOD FOR VEHICLE INCLUDING SECONDARY BATTERY

(71) Applicant: Kohei Oda, Yamato (JP)

(72) Inventor: Kohei Oda, Yamato (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/353,383

(22) PCT Filed: Oct. 10, 2012

(86) PCT No.: PCT/IB2012/002002
§ 371 (c)(1),
(2) Date: Apr. 22, 2014

(87) PCT Pub. No.: WO2013/061122
PCT Pub. Date: May 2, 2013

(65) Prior Publication Data
US 2014/0303821 A1    Oct. 9, 2014

(30) Foreign Application Priority Data

Oct. 25, 2011   (JP) .................................. 2011-233545

(51) Int. Cl.
*B60L 11/18*    (2006.01)
*B60L 1/00*    (2006.01)
*H02J 7/14*    (2006.01)

(52) U.S. Cl.
CPC ............. *B60L 11/1861* (2013.01); *B60L 1/006* (2013.01); *B60L 11/18* (2013.01); *B60L 11/1803* (2013.01);
(Continued)

(58) Field of Classification Search
CPC ....... H02J 7/1438; H02J 7/1423; B60L 1/006;
B60L 11/18; B60L 11/1803; B60L 11/1861;
B60L 11/1862; B60L 11/1881; B60L 11/1887;
B60L 2220/18; B60L 2210/10; B60L 2210/40;
Y02T 10/7044; Y02T 10/705; Y02T 10/7216;
Y02T 90/34; Y02T 10/7005; Y02T 10/7241
USPC ........... 701/22, 29.1; 180/65.1; 320/137, 136,
320/107, 108, 134
See application file for complete search history.

(56) References Cited

U.S. PATENT DOCUMENTS 7,447,572 B2 * 11/2008 Fuse et al. .......................... 701/22
2006/0272868 A1 * 12/2006 Fuse et al. ..................... 180/65.1
2010/0164287 A1    7/2010 Komazawa et al.

FOREIGN PATENT DOCUMENTS

JP    2001-258177 A    9/2001
JP    2002-008694 A    1/2002
(Continued)

*Primary Examiner* — Marthe Marc-Coleman
(74) *Attorney, Agent, or Firm* — Kenyon & Kenyon LLP

(57) ABSTRACT

A vehicle including a secondary battery includes an electricity generation device; an amount-of-stored electricity detection portion; an inverter that converts electric power output from the secondary battery into alternating-current power; an external load connection portion that connects an external load to the secondary battery via the inverter; and a control portion (10) that controls charging/discharging of the secondary battery. The control portion causes the electricity generation device to charge the secondary battery based on a value detected by the amount-of-stored electricity detection portion such that the amount of electricity stored in the secondary battery is in a predetermined range, and the control portion performs a control such that when the electric power is supplied to the external load during stoppage of the vehicle, an upper limit value of the amount of stored electricity is different from the upper limit value during traveling of the vehicle.

4 Claims, 6 Drawing Sheets

(52) U.S. Cl.
CPC ......... *B60L 11/1862* (2013.01); *B60L 11/1881* (2013.01); *B60L 11/1887* (2013.01); *H02J 7/1423* (2013.01); *H02J 7/1438* (2013.01); *B60L 2200/18* (2013.01); *B60L 2210/10* (2013.01); *B60L 2210/40* (2013.01); *Y02T 10/705* (2013.01); *Y02T 10/7005* (2013.01); *Y02T 10/7044* (2013.01); *Y02T 10/7216* (2013.01); *Y02T 10/7241* (2013.01); *Y02T 90/34* (2013.01)

(56) References Cited

FOREIGN PATENT DOCUMENTS

| | | |
|---|---|---|
| JP | 2002-315193 A | 10/2002 |
| JP | 2008-245416 A | 10/2008 |
| JP | 2009-005450 A | 1/2009 |
| JP | 2010-154637 A | 7/2010 |
| JP | 2010-279124 A | 12/2010 |

* cited by examiner

VEHICLE INCLUDING SECONDARY BATTERY AND CONTROL METHOD FOR VEHICLE INCLUDING SECONDARY BATTERY

CROSS-REFERENCE TO RELATED APPLICATIONS

This is a national phase application based on the PCT International Patent Application No. PCT/IB2012/002002 filed on Oct. 10, 2012, claiming priority to Japanese application No. 2011-233545 filed Oct. 25, 2011, the entire contents of both of which are incorporated herein by reference.

BACKGROUND OF THE INVENTION

1. Field of the Invention

The invention relates to a vehicle including a secondary battery, and using electric power from the secondary battery as drive power.

2. Description of Related Art

Generally, a fuel cell vehicle includes a fuel cell and a secondary battery as electric power sources (Japanese Patent Application Publication No. 2010-279124 (JP 2010-279124 A) and Japanese Patent Application Publication No. 2002-008694 (JP 2002-008694 A)). The fuel cell vehicle usually uses the fuel cell as a main electric power source, and travels by using the output of the fuel cell. For example, when the output of the fuel cell cannot be changed in accordance with changes in the load, the shortfall in electric power is compensated for by the secondary battery. The secondary battery is charged with a portion of the output power of the fuel cell, regenerative electric power, etc.

A fuel cell vehicle can be caused to function as an electric power supply apparatus by connecting the secondary battery with an external load. However, since the amount of electricity generated by the fuel cell and the capacity of the secondary battery are limited, it is desirable that electric power from the secondary battery can be more efficiently supplied to the external load when the fuel cell vehicle is caused to function as a mobile electric power supply apparatus. This demand is not limited to the fuel cell vehicles but is also made with regard to other types of vehicles, such as hybrid vehicles and the like, which include a secondary battery as a subsidiary power source, and which are capable of functioning as an electric power supply apparatus for external loads.

SUMMARY OF THE INVENTION

The invention provides a technology that allows a vehicle including a secondary battery to efficiently supply electric power to an external load connected to the secondary battery.

A first aspect of the invention relates to a vehicle which includes a secondary battery and uses electric power from the secondary battery as drive power. The vehicle includes: an electricity generation device that charges the secondary battery; an amount-of-stored electricity detection portion that detects a value indicating an amount of electricity stored in the secondary battery; an inverter that converts the electric power output from the secondary battery into alternating-current power; an external load connection portion that connects an external load to the secondary battery via the inverter, the external load using alternating-current power; and a control portion that controls charging/discharging of the secondary battery. The control portion causes the electricity generation device to charge the secondary battery based on the value detected by the amount-of-stored electricity detection portion in such a manner that the amount of electricity stored in the secondary battery is in a predetermined range. The control portion controls the amount of electricity stored in the secondary battery in such a manner that when the electric power is supplied from the secondary battery to the external load during stoppage of the vehicle, an upper limit value of the amount of electricity stored in the secondary battery is different from the upper limit value during traveling of the vehicle. The inventor of the invention has found that as the voltage input to the inverter becomes closer to the alternating-current voltage output from the inverter, the inverter efficiency becomes higher. According to the vehicle of this aspect, when the electric power is supplied from the secondary battery to the external load during stoppage of the vehicle, it is possible to make the voltage input from the secondary battery to the inverter closer to the alternating-current voltage output from the inverter, by changing the upper limit value of the amount of electricity stored in the secondary battery. Therefore, the electric power can be supplied from the secondary battery to the external load with improved electric power conversion efficiency of the inverter.

In the vehicle according to the above-described aspect, the electricity generation device may be a fuel cell, and the control portion may execute (i) a usual travel control in which the fuel cell is used as a main electric power source, the secondary battery is used as a subsidiary electric power source, and an output of the fuel cell and an output of the secondary battery are used to drive the vehicle, and (ii) an electric power supply control in which during the stoppage of the vehicle, an amount of electricity generated by the fuel cell is made less than during execution of the usual travel control and the upper limit value of the amount of electricity stored in the secondary battery is made lower than during the execution of the usual travel control, and the electric power is supplied from the secondary battery to the external load. In this vehicle, when the usual vehicle travel control is executed, a sufficient amount of electricity stored in the secondary battery can be ensured, and when the electric power supply control is executed, the electric power can be efficiently supplied to the external load.

In the vehicle according to the above-described aspect, when the electric power is supplied from the secondary battery to the external load during the stoppage of the vehicle, the control portion may reduce the upper limit value of the amount of electricity stored in the secondary battery so that a voltage of the secondary battery approaches a voltage of the external load connected to the inverter. In this vehicle, since the output voltage of the secondary battery approaches the alternating-current voltage output from the inverter, the electric power from the secondary battery can be efficiently supplied to the external load.

In the vehicle according to the above-described aspect, when the electric power is supplied from the secondary battery to the external load during the stoppage of the vehicle, the control portion may determine an amount of reduction in the upper limit value of the amount of electricity stored in the secondary battery, based on the electric power used by the external load. The inventor of the invention has found that an amount of increase in the inverter efficiency obtained when the voltage input to the inverter is reduced changes according to the output electric power of the inverter. Thus, according to the vehicle of this aspect, the amount of electricity stored in the secondary battery (the voltage input to the inverter) can be appropriately reduced according to the electric power used by the external load. Therefore, electric power from the secondary battery can be more efficiently supplied to the external load.

A second aspect of the invention relates to a control method for a vehicle which includes a secondary battery and an electricity generation device that charges the secondary battery. The vehicle uses electric power from the secondary battery as drive power. The control method includes detecting a value indicating an amount of electricity stored in the secondary battery; and causing the electricity generation device to charge the secondary battery based on the detected value in such a manner that an amount of electricity stored in the secondary battery is in a predetermined range, wherein in causing the electricity generation device to charge the secondary battery, the amount of electricity stored in the secondary battery is controlled in such a manner that when the electric power is supplied from the secondary battery to an external load during stoppage of the vehicle, an upper limit value of the amount of electricity stored in the secondary battery is different from the upper limit value during traveling of the vehicle. According to this control method, the output of the secondary battery can be efficiently supplied to the external load during the stoppage of the vehicle.

The invention can be realized in various forms. For example, the invention can be realized in the forms of a vehicle that travels by using electric power from a secondary battery, such as a fuel-cell vehicle including a secondary battery, a control method for the vehicle, a program for executing the control method, a storage medium where the program is stored, etc.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
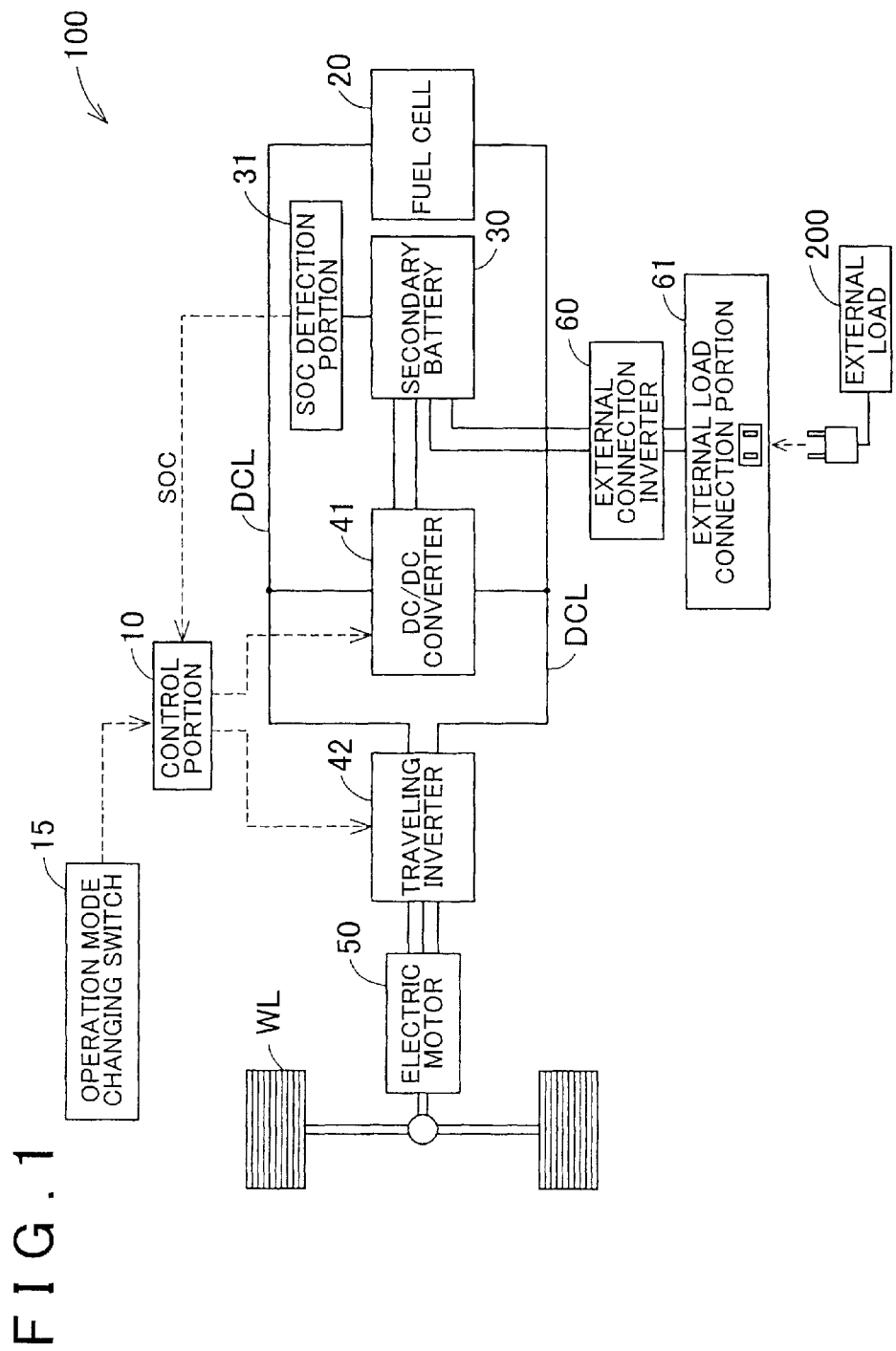
FIG. 1 is a schematic diagram showing a configuration of a fuel cell vehicle in accordance with a first embodiment of the invention.

A. First Embodiment: FIG. 1 is a schematic diagram showing a configuration of a fuel cell vehicle 100 in accordance with a first embodiment of the invention. The fuel cell vehicle 100 includes a fuel cell 20 and a secondary battery 30, and travels by using electric power from the fuel cell 20 and the secondary battery 30 as drive power. The fuel cell vehicle 100 in accordance with the embodiment is capable of functioning as a mobile electric power supply apparatus that supplies electric power to an external load 200 when the fuel cell vehicle 100 is in a stopped state. Concretely, the fuel cell vehicle 100 has a configuration as follows.

The fuel cell 20 is a solid polymer fuel cell that receives hydrogen and air as reaction gases, and generates electric power. The secondary battery 30 may be constituted by, for example, a lithium-ion battery. The fuel cell 20 and the secondary battery 30 are not limited to solid polymer fuel cells and lithium-ion batteries, respectively, and various other kinds of fuel cells and various other kinds of rechargeable batteries may be employed.

The fuel cell vehicle 100 further includes a control portion 10, an operation mode changing switch 15, an SOC detection portion 31, a DC/DC converter 41, a traveling inverter 42, an electric motor 50, an external connection inverter 60, an external load connection portion 61, and wheels WL. Although the fuel cell vehicle 100 includes reaction gas supply portions and discharge portions for electricity generation of the fuel cell 20, a cooling medium supply portion, etc., illustrations and descriptions thereof are omitted herein. Although in the fuel cell vehicle 100, portions of the electric power from the fuel cell 20 and the secondary battery 30 are used to drive accessories of the fuel cell vehicle 100, illustrations and descriptions of the accessories and the wirings for the accessories are omitted.

The control portion 10 is configured using a microcomputer including a central processing unit and a main storage device. The control portion 10 receives a switching operation performed by a driver of the vehicle 100 through the operation mode changing switch 15, and switches the operation mode of the fuel cell vehicle 100. It is to be noted herein that the fuel cell vehicle 100 of this embodiment has a "usual travel mode" and an "electric power supply mode" as operation modes mentioned above.

The usual travel mode is a mode for causing the fuel cell vehicle 100 to travel on the basis of the driver's operation. While the usual travel mode is a selected mode, the control portion 10 receives the operation performed by the driver, for example, an accelerator operation or the like, and the control portion 10 controls the electricity generation of the fuel cell 20 and the charging and discharging of the secondary battery 30 according to the driver's operation. On the other hand, the electric power supply mode is a mode in which the fuel cell vehicle 100 is caused to function as an electric power supply apparatus that supplies electric power to an external load. Concrete controls executed during these operation modes will be described later.

The SOC detection portion 31 detects the state of charge (SOC) of the secondary battery 30, and sends it to the control portion 10. In this specification, the "state of charge (SOC)" means the proportion of the amount of remaining electricity (amount of stored electricity) to the present charge capacity of the secondary battery 30. The SOC detection portion 31 detects the temperature of the secondary battery 30, and the output voltage and the output current thereof, and detects the SOC of the secondary battery 30 on the basis of the detected values of the temperature, the output voltage and the output current of the secondary battery 30.

The control portion 10 acquires the SOC detected by the SOC detection portion 31, and controls the charging/discharging of the secondary battery 30 on the basis of the acquired SOC in such a manner that the SOC of the secondary battery 30 is in a predetermined range. Hereinafter in this specification, the charging/discharging control for the secondary battery 30 executed by the control portion 10 on the basis of the detected value of the SOC will be referred to as "SOC feedback control". When starting the SOC feedback control, the control portion 10 preliminarily sets a target SOC value that serves as a reference for defining the range of change in the SOC of the secondary battery 30. The target SOC value will be described later.

It is to be noted herein that the fuel cell 20 is connected to the traveling inverter 42 via a direct-current wiring DCL, and the secondary battery 30 is connected to the direct-current wiring DCL via the DC/DC converter 41. Although a diode for preventing the reverse flow of current from the secondary battery 30 to the fuel cell 20 is provided on the direct-current wiring DCL, illustration of the diode is omitted from the drawings.

The traveling inverter 42 is connected to the electric motor 50 that drives the wheels WL via a gear and the like. The electric motor 50 is constituted by a synchronous electric motor that includes three-phase coils. The traveling inverter 42 converts output electric power of the fuel cell 20 and the secondary battery 30 into three-phase alternating-current power, and supplies the three-phase alternating-current power to the electric motor 50.

During the usual travel mode, the control portion 10 generates drive signals corresponding to the accelerator operation amount, and sends the drive signals to the traveling inverter 42 and the DC/DC converter 41. The traveling inverter 42, according to the drive signal from the control portion 10, causes the electric motor 50 to operate in accordance with the accelerator operation amount, for example, by adjusting the pulse width of the alternating-current voltage.

The DC/DC converter 41, according to the drive signal from the control portion 10, variably adjusts the voltage level of the direct-current wiring DCL and switches the state of charging/discharging of the secondary battery 30. When the electric motor 50 produces regenerative electric power, the regenerative electric power is converted into direct-current power by the traveling inverter 42, and then is charged into the secondary battery 30 via the DC/DC converter 41.

In the fuel cell vehicle 100 of this embodiment, the external connection inverter 60 is connected to the secondary battery 30. The external connection inverter 60 is connected to the external load connection portion 61 to which the external load 200 can be connected. The external load 200 operates on alternating-current power. This configuration makes it possible for the fuel cell vehicle 100 to supply electric power stored in the secondary battery 30 to the external load 200 connected to the external load connection portion 61. The external connection inverter 60 in this embodiment is constituted by an inverter that has an output voltage of AC 100 V. The external load connection portion 61 is connected to the external load 200 via a commercial power supply receptacle.

Figure 2:
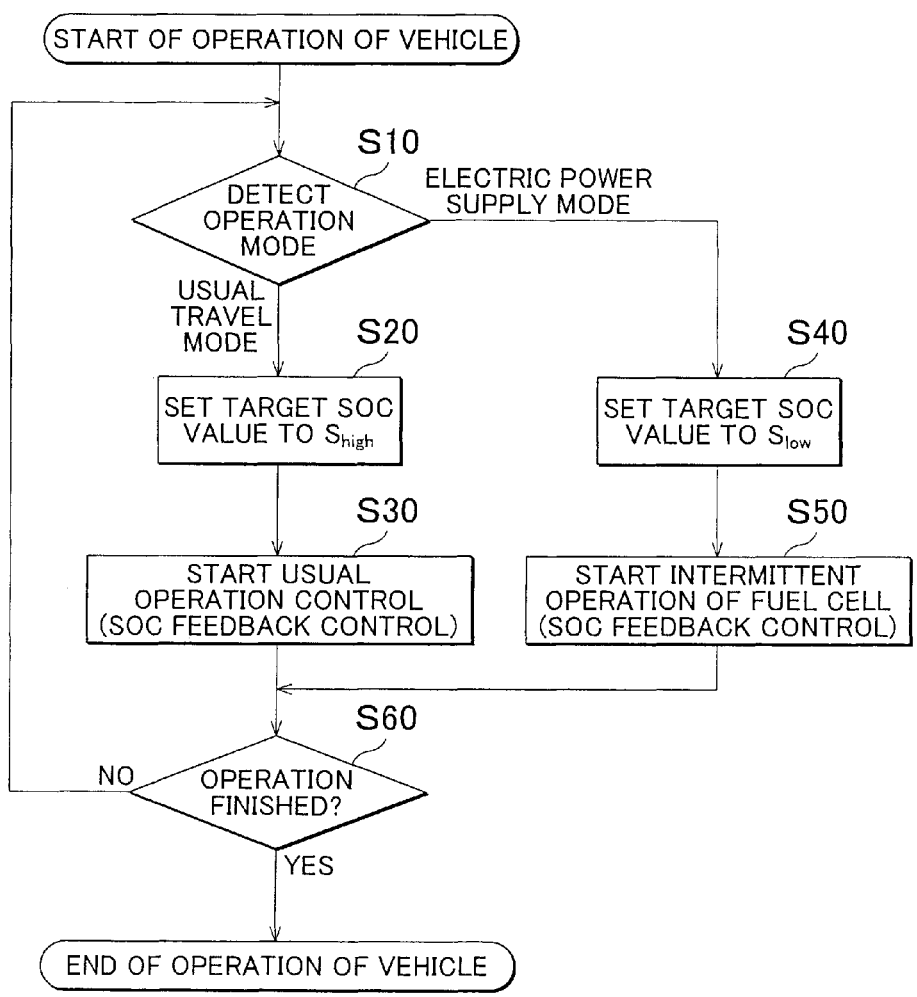
FIG. 2 is a flowchart for explaining a control procedure for a fuel cell vehicle executed by a control portion in embodiments of the invention.

FIG. 2 is a flowchart for explaining a control procedure for the fuel cell vehicle 100 executed by the control portion 10. In step S10, the control portion 10 detects the operation mode selected by the driver, on the basis of the operation mode changing switch 15. When the usual travel mode is a selected mode, the control portion 10 sets the target SOC value, which serves as a reference for the control of the amount of electricity stored in the secondary battery 30, to $S_{high}$ that is a predetermined first value (step S20).

In step S30, the control portion 10 starts a usual operation control by using the fuel cell 20 as a main electric power source and the secondary battery 30 as a subsidiary electric power source. Concretely, the control portion 10 causes the fuel cell 20 to generate electric power according to the accelerator operation amount, and uses the output of the fuel cell 20 to drive the electric motor 50 or to drive other accessories and the like, or to charge the secondary battery 30.

When the output electric power of the fuel cell 20 falls short, for example, when the output of the fuel cell 20 cannot be changed in accordance with changes in the demand regarding the output (accelerator operation amount) or the like, the control portion 10 discharges the secondary battery 30 so as to compensate for the shortfall. The SOC of the secondary battery 30 is maintained in a predetermined range defined on the basis of the first value $S_{high}$, through the foregoing SOC feedback control. This will be described in detail later.

On the other hand, if the electric power supply mode has been selected by the operation mode changing switch 15 (step S10), the control portion 10 sets the target SOC value, which serves as the reference for the control of the SOC of the secondary battery 30, to $S_{low}$, that is a predetermined second value (step S40). In step S50, the control portion 10, using the target SOC value set to the second value $S_{low}$, starts the SOC feedback control regarding the secondary battery 30, and causes the secondary battery 30 to start supplying electric power to the external load 200 via the external connection inverter 60.

During the electric power supply mode, the control portion 10 causes intermittent operation of the fuel cell 20. The intermittent operation of the fuel cell 20 means a manner of operation in which basically, the electricity generation of the fuel cell 20 is stopped or the output of the fuel cell 20 is substantially zero, and the fuel cell 20 is caused to operate to charge the secondary battery 30 only when the charging of the secondary battery 30 becomes necessary.

The control portion 10 continues the control in the usual travel mode or the control in the electric power supply mode until the driver finishes operating the fuel cell vehicle 100 (step S60). The switching of the operation mode via the operation mode changing switch 15 may be enabled only when the fuel cell vehicle 100 is in the stopped state. Furthermore, the electrical connection of the fuel cell 20 and the secondary battery 30 with the electric motor 50 may be interrupted during control in the electric power supply mode. On the other hand, during control in the usual travel mode, the electrical connection between the external load 200 and the secondary battery 30 may be interrupted.

Figure 3:
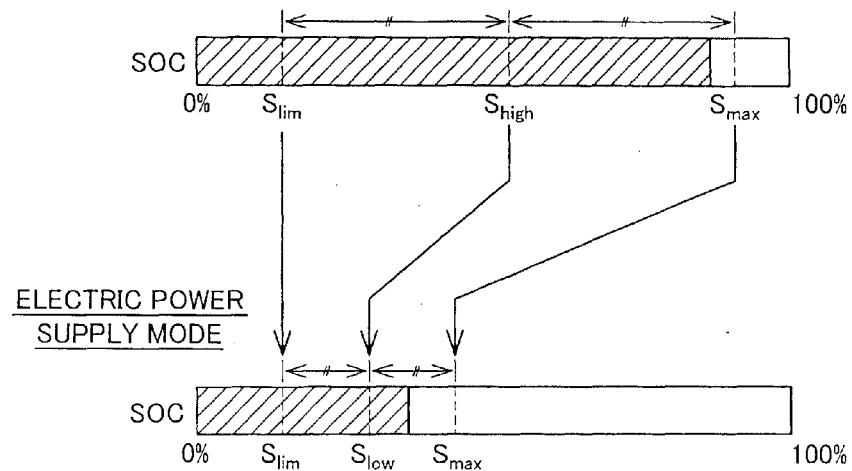
FIG. 3 is an illustrative diagram for explaining an SOC feedback control executed in the embodiments of the invention.

FIG. 3 is an illustrative diagram for explaining differences between the SOC feedback control in the usual travel mode and the SOC feedback control in the electric power supply mode. Top and bottom portions of FIG. 3 show bar charts showing the SOC of the secondary battery 30 in the usual travel mode and the electric power supply mode, respectively, in a gauged manner in which the two bar charts correspond to each other. In these bar charts of FIG. 3, the left end is defined as SOC=0%, and the right end is defined as SOC=100%, and hatched regions each show the SOC of the secondary battery 30.

Concretely, the SOC feedback control executed in steps S30 and S50 are executed as follows. The control portion 10 sets an upper limit value $S_{max}$ and a lower limit value $S_{lim}$ of the SOC by using, as center values, the target SOC values $S_{high}$ and $S_{low}$ set in step S20 and step S40, respectively. It is preferable that the upper limit value $S_{max}$ and the lower limit value $S_{lim}$ of the SOC during the usual travel mode be determined as values that restrain degradation of the secondary battery 30 due to excessively large or excessively small amount of electricity stored in the secondary battery 30. Besides, it is preferable that the lower limit value $S_{lim}$ of the SOC during the electric power supply mode be set equal to the lower limit value $S_{lim}$ of the SOC during the usual travel mode.

The control portion 10 appropriately starts the charging of the secondary battery 30 so that the SOC of the secondary battery 30 does not become lower than the lower limit value $S_{lim}$, and appropriately stops the charging so that the SOC of the secondary battery 30 does not exceed the upper limit value $S_{high}$. Due to this SOC feedback control, the range of change of the SOC of the secondary battery 30 is reduced toward the lower limit value during the electric power supply mode in comparison with the usual travel mode, and the upper limit value of the SOC of the secondary battery 30 is made lower during the electric power supply mode than during the usual travel mode. A reason for lowering the upper limit value of the SOC of the secondary battery 30 during the electric power supply mode will be explained.

Figure 4:
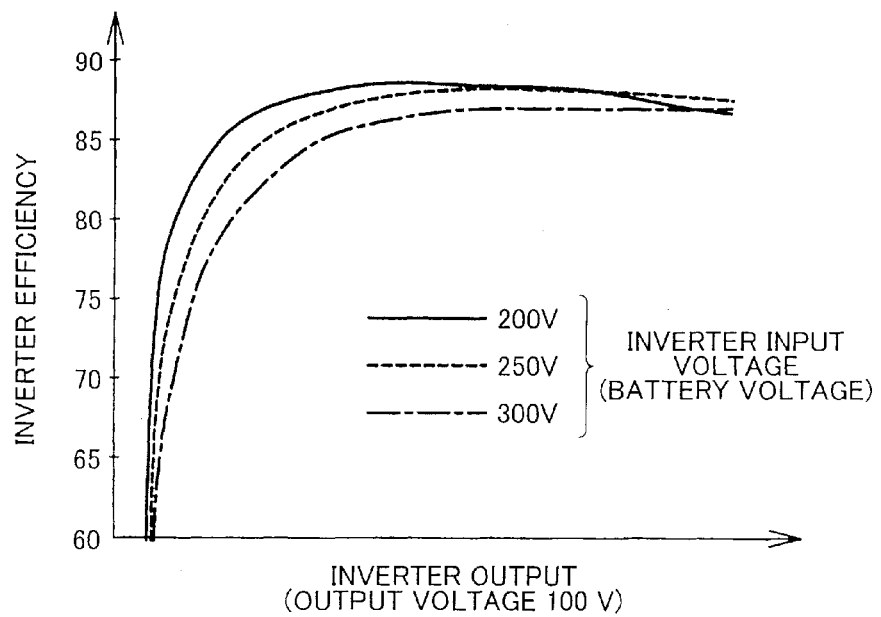
FIG. 4 is an illustrative diagram for explaining a relation between an inverter output and an inverter efficiency.

FIG. 4 is a graph obtained from experiments carried out by the inventor of the invention and showing an example of a relation between the electric power output from the inverter (hereinafter, referred to as "inverter output") and an inverter efficiency. It is to be noted herein that the "inverter efficiency" means the proportion of the electric power output from the inverter to the electric power input to the inverter, and means the efficiency of the electric power conversion performed by the inverter.

The inventor of the invention connected a secondary battery to an inverter whose output voltage was AC 100 V, and measured the inverter efficiency with respect to the electric power output from the inverter, separately at each of different values of the output voltage of the secondary battery. In the description below, the voltage output from the secondary battery, that is, the voltage input to the inverter from the secondary battery, will be referred to as "inverter input voltage".

At any value of the inverter input voltage, the inverter efficiency conspicuously increased in an initial stage where the inverter output was relatively small, and then remained substantially at a constant value. Furthermore, as the inverter input voltage was closer to the AC output voltage (100 V) of the inverter, the inverter efficiency was more likely to be high over a substantially entire range of the inverter output until the inverter output became extremely high.

Figure 5:
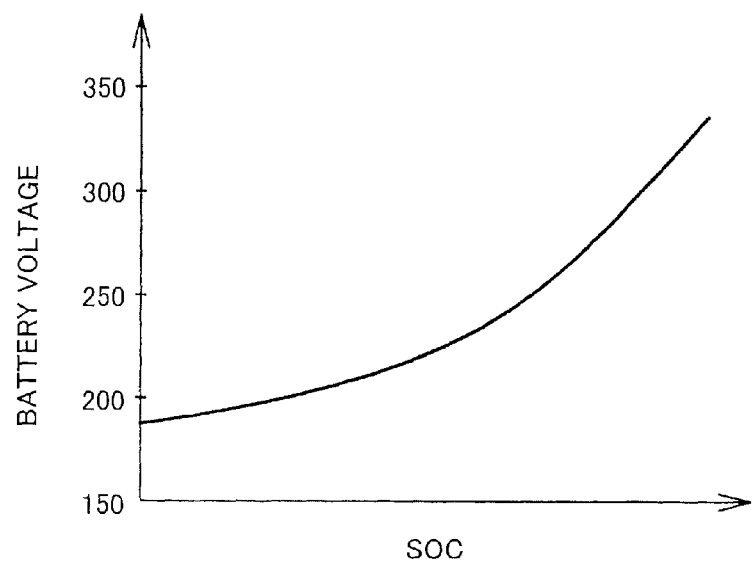
FIG. 5 is an illustrative diagram for explaining a relation between the SOC of a secondary battery and a battery voltage.

FIG. 5 is a graph obtained from experiments carried out by the inventor of the invention and showing an example of a relation between the SOC of the secondary battery and the output voltage of the secondary battery (hereinafter, also referred to as "battery voltage"). The inventor of the invention changed the SOC of the secondary battery, and measured the battery voltage at each of the values of SOC. As shown by the graph, there is a unique relation between the SOC of the secondary battery and the output voltage of the secondary battery. As the SOC becomes higher, the output voltage becomes higher.

Figure 6:
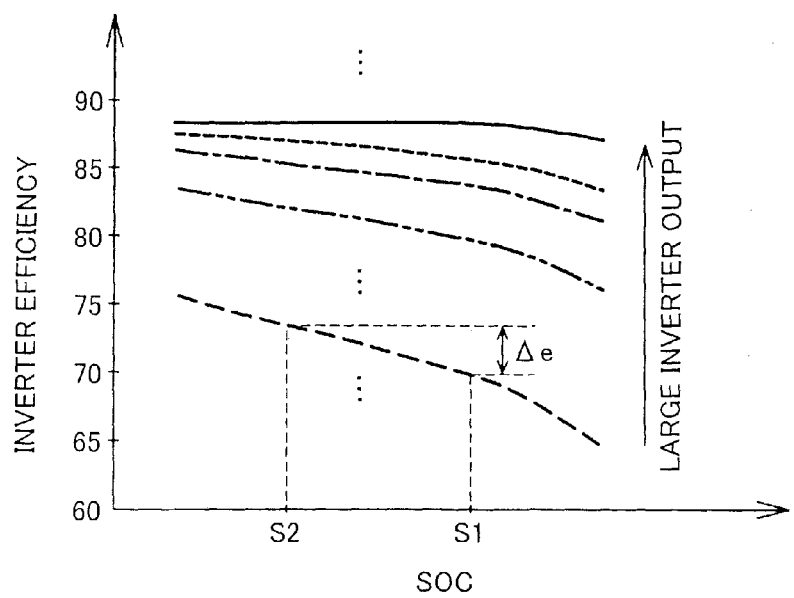
FIG. 6 is an illustrative diagram for explaining a relation between the SOC of the secondary battery and the inverter efficiency.

FIG. 6 is a graph showing an example of a relation between the SOC of the secondary battery and the inverter efficiency. Since the battery voltage is equivalent to the inverter input voltage, the inverter efficiency with respect to the SOC can be determined separately at each of values of the inverter output by using the correspondence between the inverter input voltage in FIG. 4 and the battery voltage in FIG. 5. From the graph of FIG. 6, it can be understood that the inverter efficiency of the inverter connected to the secondary battery tends to increase as the SOC of the secondary battery decreases, and that the tendency is more conspicuous as the inverter output becomes smaller.

As described above in conjunction with FIG. 3, in the fuel cell vehicle 100 of this embodiment, the upper limit of the SOC of the secondary battery 30 is made lower during the electric power supply mode than during the usual travel mode. Therefore, during the electric power supply mode, the supply of electric power to the external connection inverter 60 is continued while the SOC of the secondary battery 30 is low, in comparison with the usual travel mode.

As described above in conjunction with FIGS. 4 to 6, as the SOC of the secondary battery 30 becomes lower, the higher inverter efficiency of the external connection inverter 60 can be obtained. That is, in the fuel cell vehicle 100 of this embodiment, during the electric power supply mode, the upper limit of the SOC of the secondary battery 30 is lowered, so that the high inverter efficiency of the external connection inverter 60 can be obtained. Therefore, electric power from the secondary battery 30 can be more efficiently supplied to the external load 200, and the time during which supply of electric power is possible can be increased.

Furthermore, as described above in conjunction with FIG. 4, as the inverter input voltage becomes closer to (approaches) the alternating-current voltage output from the inverter, the inverter efficiency becomes higher. Therefore, the target SOC value during the electric power supply mode may be set so that the output voltage of the secondary battery 30 becomes closer to the output voltage of the external connection inverter (100 V in this embodiment).

Thus, in the fuel cell vehicle 100 of this embodiment, during the usual travel mode, during which there is a possibility that high output of the secondary battery 30 may be required, the target SOC value is set to a high value in order to secure a sufficient amount of electricity stored in the secondary battery 30. Then, during the electric power supply mode, during which efficient supply of electric power from the secondary battery 30 to the external load 200 is required, the target SOC value is set to a low value to increase the inverter efficiency of the external connection inverter 60, so that the efficiency of supply of electric power to the external load 200 is increased.

In the fuel cell vehicle 100 of this embodiment, the fuel cell 20 is intermittently operated during the electric power supply mode. However, as described above, since the frequency at which the fuel cell 20 is repeatedly started and stopped can be reduced due to the increase in the efficiency of supply of electric power to the external load 200, degradation of the fuel cell 20 can be restrained.

Figure 7:
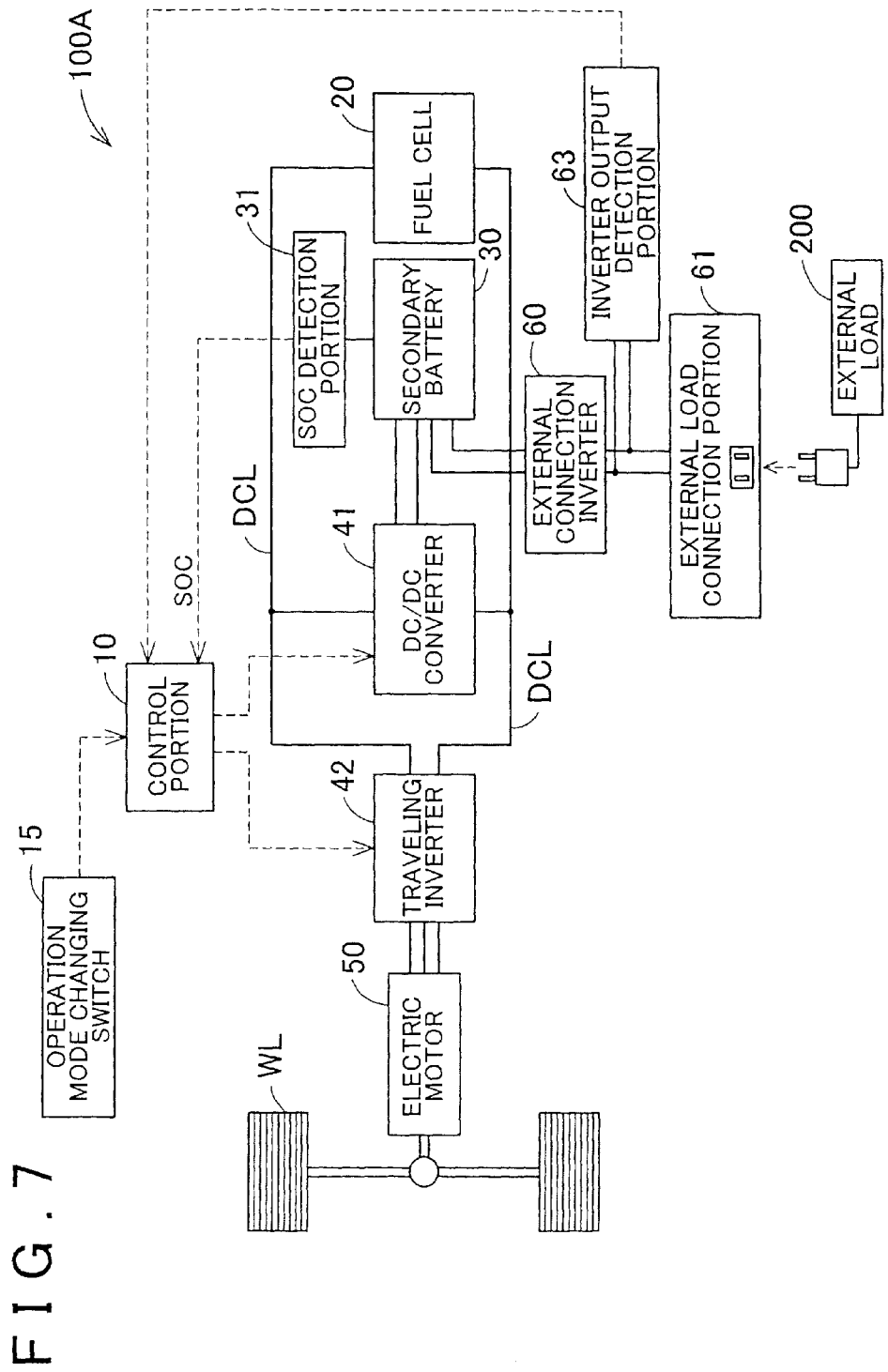
FIG. 7 is a schematic diagram showing a configuration of a fuel cell vehicle in accordance with a second embodiment of the invention.

B. Second Embodiment: FIG. 7 is a schematic diagram showing a configuration of a fuel cell vehicle 100A according to a second embodiment of the invention. FIG. 7 is substantially the same as FIG. 1, except that an inverter output detection portion 63 is provided. The inverter output detection portion 63 acquires or detects the inverter output of the external connection inverter 60 (i.e., electric power supplied to the external load 200) by detecting the value of current and the value of voltage between the external connection inverter 60 and the external load connection portion 61.

In the fuel cell vehicle 100A of the second embodiment, the control portion 10 executes an SOC feedback control for the secondary battery 30 by making the target SOC value during the electric power supply mode different from the target SOC value during the usual travel mode (FIG. 2), similarly to the fuel cell vehicle 100 in the first embodiment. However, in the fuel cell vehicle 100A of the second embodiment, the target SOC value set during the electric power supply mode is determined by the control portion 10 as described below.

Figure 8:
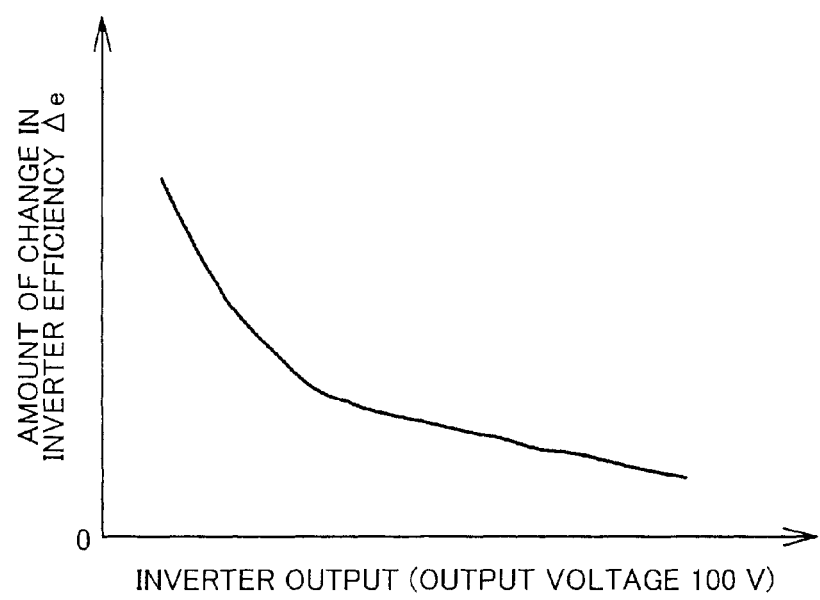
FIG. 8 is an illustrative diagram for explaining a relation between the inverter output and the amount of change in the inverter efficiency.

FIG. 8 is a graph showing an example of a relation between the inverter output and the amount of change in the inverter efficiency obtained when the SOC of the secondary battery is reduced by a predetermined value. The graph of FIG. 8 can be obtained by determining, in the graph of FIG. 6, an amount of change (amount of increase) Δe in the inverter efficiency which occurs when the SOC is decreased from a first value $S_1$ to a second value $S_2$, separately at each of the values of the inverter output. From the graph of FIG. 8, it can be understood that as the inverter output becomes lower, the amount of change Δe in the inverter efficiency increases.

Thus, in the inverter, in the case where the inverter output is relatively high, the degree of improvement in the inverter efficiency achieved by reducing the inverter input voltage is relatively small. Therefore, even in the case where during the electric power supply mode, the target SOC value of the secondary battery 30 is made lower than during the usual travel mode, there is a possibility of increasing the frequency of the charging of the secondary battery 30 depending on the electric power used by the external load 200. If the frequency of the charging of the secondary battery 30 increases, there is a possibility that the degradation of the secondary battery 30 may be accelerated. Furthermore, if the frequency of the charging of the secondary battery 30 increases, the frequency, at which the electricity generation of the fuel cell 20 is repeatedly started and stopped, is increased. This may cause degradation of the fuel cell 20 or a decline in the fuel economy of the fuel cell vehicle 100A.

Therefore, in the fuel cell vehicle 100A of the second embodiment, the control portion 10 receives the detected value from the inverter output detection portion 63 and, on the basis of the detected value, determines an amount of reduction in the target SOC value of the secondary battery 30 during the electric power supply mode, i.e., an amount by which the target SOC value of the secondary battery 30 is reduced during the electric power supply mode. Hence, according to the electric power used by the external load 200, an amount of reduction in the upper limit value of the SOC of the secondary battery 30 during the electric power supply mode is determined (in other words, an amount of reduction in an upper limit value of the amount of electricity stored in the secondary battery 30 during the electric power supply mode is determined). Concretely, the control portion 10 may determine the target SOC value so that when the inverter output of the external connection inverter 60 is large, the amount of reduction in the target SOC value is made smaller than when the inverter output is small. In other words, when the electric power used by the external load 200 is large, the control portion 10 may make the amount of reduction in the upper limit value of the SOC of the secondary battery 30 (or the amount of reduction in the upper limit value of the amount of electricity stored in the secondary battery 30) smaller than when the electric power used by the external load 200 is small. Alternatively, the control portion 10 may reduce the amount of reduction in the target SOC value as the inverter output of the external connection inverter 60 increases. In other words, the control portion 10 may reduce the amount of reduction in the upper limit value of the SOC of the secondary battery 30 (or the amount of reduction in the upper limit value of the amount of electricity stored in the secondary battery 30) as the electric power used by the external load 200 increases.

In this manner, in the fuel cell vehicle 100A of the second embodiment, the amount of reduction in the target SOC value of the secondary battery 30 during the electric power supply mode is determined according to the electric power used by the external load 200. Therefore, it is possible to reduce the possibility that during the electric power supply mode, the amount of electricity stored in the secondary battery 30 becomes excessively small with respect to the electric power used by the external load 200, which leads to increased frequency of the charging of the secondary battery 30. Accordingly, it is possible to restrain degradation of the fuel cell 20 and a decline in the fuel economy of the fuel cell vehicle 100.

C. Modifications: The invention is not limited to the foregoing embodiments or examples, but can also be implemented in various other manners without departing from the scope of the invention. For example, in the foregoing embodiments, the invention is applied to a fuel cell vehicle including a secondary battery. However, the invention may also be applied to other kinds of vehicles including a secondary battery. Concretely, the invention can be applied to vehicles, such as hybrid vehicles, plug-in hybrid vehicles, etc., in which a control is executed so that the amount of electricity stored in the secondary battery is in a predetermined range by causing an internal combustion engine to function as an electricity generation apparatus while using electric power from the secondary battery as drive power. Furthermore, by applying the invention particularly to large-size vehicles including a fuel cell, such as fuel cell buses, fuel cell trucks, etc., it is possible to configure electric power supply vehicles that are excellent in the electric power supply efficiency. Thus, the invention is useful. Furthermore, the embodiments of the invention can also be modified as follows.

C1. First Modification: In the foregoing embodiments, the upper limit value of the amount of electricity stored in the secondary battery 30 during the electric power supply mode is made different from that during the usual travel mode, by setting the target SOC value used in the SOC feedback control for the secondary battery 30 during the usual travel mode and the target SOC value during the electric power supply mode to different values. The usual travel mode and the electric power supply mode and are operation modes that are preliminarily set. However, the operation modes do not necessarily need to be preliminarily set in the fuel cell vehicles 100 and 100A, and the change in the upper limit value of the amount of electricity stored in the secondary battery 30 does not necessarily need to be based on the operation mode, as long as in the fuel cell vehicles 100 and 100A, the amount of electricity stored in the secondary battery 30 is controlled in such a manner that when electric power is supplied to the external load 200 during the stoppage of the vehicle, the upper limit value of the amount of electricity stored in the secondary battery 30 is different from the upper limit value during traveling of the vehicle.

The phrase "during stoppage of the fuel cell vehicle (that is, the stopped state of the fuel cell vehicle)" means a state in which electric power for driving the electric motor 50 is not supplied from the fuel cell 20 or the secondary battery 30. The phrase "during stoppage of the fuel cell vehicle (the stopped state of the fuel cell vehicle)" does not include a so-called idling state, that is, a state in which acceleration of the vehicle is about to occur on the basis of an accelerator operation or a gear shift. This state includes a state in which movement of the fuel cell vehicle 100 is restricted in a fixed manner by a braking mechanism, such as a parking brake (a so-called hand brake) or the like. The phrase "during traveling of the fuel cell vehicle 100" means a state in which the electric motor 50 is driven by using electric power from at least one of the fuel cell 20 and the secondary battery 30. This state includes the aforementioned idling state (except the state in which movement of the vehicle is restricted in a fixed manner by a braking mechanism such as a parking brake or the like).

C2. Second Modification: In the foregoing embodiments, the control portion 10 executes the control so that the SOC of the secondary battery 30 is in the predetermined range, on the basis of the SOC of the secondary battery 30 (SOC feedback control). However, the control portion 10 does not necessarily need to execute the SOC feedback control based on the SOC of the secondary battery 30. The control portion 10 may control the charging/discharging of the secondary battery 30 on the basis of a value indicating the amount of electricity stored in the secondary battery 30 in such a manner that the amount of electricity stored in the secondary battery 30 is in the predetermined range. In this case, the control portion 10 may set the target value of the amount of stored electricity instead of the target SOC value.

It is to be noted herein that the SOC of the secondary battery 30 is a value that indicates the amount of electricity stored in the secondary battery 30. Therefore, the SOC feedback control in the fuel cell vehicle 100 of the foregoing embodiment can be understood as being a control that is executed by the control portion 10 to control the charging/discharging of the secondary battery 30 on the basis of the acquired value indicating the amount of electricity stored in the secondary battery 30 in such a manner that the amount of electricity stored in the secondary battery 30 is in the predetermined range. Although in the foregoing embodiment, the upper limit value $S_{max}$ of the SOC of the secondary battery 30 is lowered during the electric power supply mode, it can be understood that this lowers the upper limit value of the amount of electricity stored in the secondary battery 30.

C3. Third Modification: In the foregoing embodiments, in the fuel cell vehicles 100 and 100A, the fuel cell 20 is intermittently operated during the electric power supply mode. However, in the fuel cell vehicles 100 and 100a, the fuel cell 20 does not necessarily need to be intermittently operated during the electric power supply mode. In the fuel cell vehicles 100 and 100A, the output of the fuel cell 20 may be made smaller during the electric power supply mode than during the usual travel mode, so that during the electric power supply mode, the amount of electricity generated by the fuel cell 20 is decreased. In order to improve the fuel economy of the fuel cell vehicles 100 and 100A, it is also preferable that the amount of electricity generated by the fuel cell 20 be decreased during the electric power supply mode, that is, when the fuel cell vehicle 100 is in the stopped state.

C4. Fourth Modification: In the foregoing embodiments, the external connection inverter 60 is constituted by an inverter whose output voltage is AC 100 V, and the external load connection portion 61 is configured as a connector that is connected to the external load 200 via the commercial power supply receptacle. However, the external connection inverter 60 does not necessarily need to be the inverter whose output voltage is AC 100 V, and the external load connection portion 61 does not necessarily need to be connected to the external load 200 via a commercial power supply receptacle. It is only necessary that the external connection inverter 60 should be a device that converts the direct-current power from the secondary battery 30 into alternating-current power. Also, it is only necessary that the external load connection portion 61 should be a device capable of electrically connecting the external connection inverter 60 and the external load 200, and various connector configurations and various connection manners may be employed.

C5. Fifth Modification: In the foregoing embodiments, the control portion 10 sets the upper limit value $S_{max}$ and the lower limit value $S_{lim}$ of the SOC with the target SOC value being a center value, and controls the charging/discharging of the secondary battery 30 so that the SOC is in the range from the upper limit value $S_{max}$ to the lower limit value $S_{lim}$. However, the control portion 10 may directly set the upper limit value $S_{max}$ and the lower limit value $S_{lim}$ of the SOC without setting the target SOC value. Furthermore, although in the foregoing embodiments, the lower limit value $S_{lim}$ of the SOC for the usual travel mode and the lower limit value $S_{lim}$ for the electric power supply mode are set to the same value, the lower limit value $S_{lim}$ for the usual travel mode and the lower limit value $S_{lim}$ for the electric power supply mode may be set to different values. However, it is desirable that the lower limit value $S_{lim}$ of the SOC during the electric power supply mode be set so that degradation of the secondary battery 30 is restrained and so that the frequency of the charging of the secondary battery 30 does not conspicuously increase.

C6. Sixth Modification: In the foregoing embodiments, in the fuel cell vehicles 100 and 100A, the operation mode is switched between the usual travel mode and the electric power supply mode by using the operation mode changing switch 15. However, the operation mode changing switch 15 may be omitted. In this case, the control portion 10 may switch the operation mode between the usual travel mode and the electric power supply mode on the basis of the state of operation of the fuel cell vehicles 100 and 100A or the state of connection of the external load 200. For example, the control portion 10 may automatically switch the operation mode to the electric power supply mode when the external load 200 is connected during idling of the fuel cell vehicle 100 or when the external load 200 starts using electric power or when the parking brake is applied. Furthermore, the control portion 10 may forcibly switch the operation mode to the usual travel mode by interrupting the electrical connection to the external load 200 if during the electric power supply mode, the parking brake is released or the accelerator pedal is depressed.

C7. Seventh Modification: In the foregoing embodiments, when electric power is supplied to the external load 200 during the stoppage of the fuel cell vehicles 100 and 100A, the control portion 10 makes the upper limit value of the amount of electricity stored in the secondary battery 30 lower than during the traveling of the fuel cell vehicles 100 and 100A. However, in the case where the output voltage of the external connection inverter 60 is higher than the upper limit value of the output voltage of the secondary battery 30 used during the traveling of the fuel cell vehicle 100 or 100A, the control portion 10 may make the upper limit value of the amount of electricity stored in the secondary battery 30 higher when electric power is supplied to the external load 200 during the stoppage of the fuel cell vehicle 100 or 100A than when the fuel cell vehicle 100 or 100A is traveling.

What is claimed is:

1. A vehicle which includes a secondary battery and uses electric power from the secondary battery as drive power, the vehicle comprising:
    an electricity generation device that charges the secondary battery;
    an amount-of-stored electricity detection portion that detects a value indicating an amount of electricity stored in the secondary battery;
    an inverter that converts the electric power output from the secondary battery into alternating-current power;
    an external load connection portion that connects an external load to the secondary battery via the inverter, the external load using alternating-current power; and
    a control portion that controls charging/discharging of the secondary battery, wherein the control portion causes the electricity generation device to charge the secondary battery based on the value detected by the amount-of-stored electricity detection portion in such a manner that the amount of electricity stored in the secondary battery is in a predetermined range, and the control portion controls the amount of electricity stored in the secondary battery in such a manner that when the electric power is supplied from the secondary battery to the external load during stoppage of the vehicle, an upper limit value of the amount of electricity stored in the secondary battery is different from the upper limit value during traveling of the vehicle, wherein when the electric power is supplied from the secondary battery to the external load during the stoppage of the vehicle, the control portion reduces the upper limit value of the amount of electricity stored in the secondary battery so that a voltage of the secondary battery approaches a voltage of the external load connected to the inverter.

2. The vehicle according to claim 1, wherein the electricity generation device is a fuel cell, and the control portion executes (i) a usual travel control in which the fuel cell is used as a main electric power source, the secondary battery is used as a subsidiary electric power source, and an output of the fuel cell and an output of the secondary battery are used to drive the vehicle, and (ii) an electric power supply control in which during the stoppage of the vehicle, an amount of electricity generated by the fuel cell is made less than during execution of the usual travel control and the upper limit value of the amount of electricity stored in the secondary battery is made lower than during the execution of the usual travel control, and the electric power is supplied from the secondary battery to the external load.

3. A vehicle which includes a secondary battery and uses electric power from the secondary battery as drive power, the vehicle comprising:
  an electricity generation device that charges the secondary battery;
  an amount-of-stored electricity detection portion that detects a value indicating an amount of electricity stored in the secondary battery;
  an inverter that converts the electric power output from the secondary battery into alternating-current power;
  an external load connection portion that connects an external load to the secondary battery via the inverter, the external load using alternating-current power; and
  a control portion that controls charging/discharging of the secondary battery, wherein the control portion causes the electricity generation device to charge the secondary battery based on the value detected by the amount-of-stored electricity detection portion in such a manner that the amount of electricity stored in the secondary battery is in a predetermined range, and the control portion controls the amount of electricity stored in the secondary battery in such a manner that when the electric power is supplied from the secondary battery to the external load during stoppage of the vehicle, an upper limit value of the amount of electricity stored in the secondary battery is different from the upper limit value during traveling of the vehicle,
  wherein when the electric power is supplied from the secondary battery to the external load during the stoppage of the vehicle, the control portion determines an amount of reduction in the upper limit value of the amount of electricity stored in the secondary battery, based on the electric power used by the external load.

4. The vehicle according to claim 3, wherein the control portion reduces the amount of reduction in the upper limit value of the amount of electricity stored in the secondary battery, as the electric power used by the external load increases.

* * * * *